(12) United States Patent  
Takasugi et al.

(10) Patent No.: US 9,334,119 B2  
(45) Date of Patent: May 10, 2016

(54) CONVEYANCE DEVICE FOR GRANULAR MATERIALS

(75) Inventors: Hajime Takasugi, Shunan (JP); Morio Iwata, Shunan (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 177 days.

(21) Appl. No.: 14/116,035

(22) PCT Filed: May 31, 2012

(86) PCT No.: PCT/JP2012/064026  
§ 371 (c)(1),  
(2), (4) Date: Nov. 6, 2013

(87) PCT Pub. No.: WO2012/165523  
PCT Pub. Date: Dec. 6, 2012

(65) Prior Publication Data  
US 2014/0144748 A1    May 29, 2014

(30) Foreign Application Priority Data

Jun. 1, 2011   (JP) .................................. 2011-123666

(51) Int. Cl.  
*B65G 11/20* (2006.01)  
*B65G 11/02* (2006.01)  
(Continued)

(52) U.S. Cl.  
CPC ............ *B65G 11/206* (2013.01); *B65G 11/026* (2013.01); *B65G 11/088* (2013.01); *B65G 69/16* (2013.01)

(58) Field of Classification Search  
CPC ... B65G 11/166; B65G 11/146; B65G 11/088

USPC ....................... 193/32, 27, 2 R, 40  
See application file for complete search history.

(56) References Cited

U.S. PATENT DOCUMENTS

| | | | | |
|---|---|---|---|---|
| 2,634,842 A | * | 4/1953 | Caylor | ........................... 193/32 |
| 2,733,800 A | * | 2/1956 | Fenske | ........................... 193/27 |
| 5,080,873 A | * | 1/1992 | Ono | ........................ B01J 4/001 |
| | | | | 117/213 |

FOREIGN PATENT DOCUMENTS

| | | |
|---|---|---|
| CN | 2839191 Y | 11/2006 |
| CN | 2918295 Y | 7/2007 |

(Continued)

OTHER PUBLICATIONS

International Search Report Issued Sep. 4, 2012 in PCT/JP12/64026 Filed May 31, 2012.

(Continued)

*Primary Examiner* — Gene Crawford  
*Assistant Examiner* — Lester Rushin  
(74) *Attorney, Agent, or Firm* — Oblon, McClelland, Maier & Neustadt, L.L.P.

(57) ABSTRACT

A plurality of buffer plates shaped in a plate project from an inclined surface of a chute of a transfer portion for transferring hydrogenated petroleum resin pellets in a manner that a planar direction of each of the buffer plates intersects with an inclination direction of the inclined surface. Hydrogenated petroleum resin pellets flowing on the inclined surface contact the buffer plates, so that a flow direction of the hydrogenated petroleum resin pellets is changed to reduce a flow speed of the hydrogenated petroleum resin pellets. By the reduction of the flow speed, impact applied on the flowing hydrogenated petroleum resin pellets is weakened, so that breakage due to the impact during transfer of the hydrogenated petroleum resin pellets can be inhibited.

9 Claims, 12 Drawing Sheets

(51) Int. Cl.
*B65G 69/16* (2006.01)
*B65G 11/08* (2006.01)

(56) References Cited

FOREIGN PATENT DOCUMENTS

| CN | 101220124 A | 7/2008 |
| CN | 201102783 Y | 8/2008 |
| CN | 201187944 Y | 1/2009 |
| CN | 101774473 A | 7/2010 |
| JP | 47 18113 | 9/1972 |
| JP | 6 293417 | 10/1994 |
| JP | 08 143162 | 6/1996 |
| JP | 2002 302093 | 10/2002 |
| JP | 2004-168473 A | 6/2004 |
| WO | 2004 056882 | 7/2004 |

OTHER PUBLICATIONS

U.S. Appl. No. 14/115,962, filed Nov. 6, 2013, Iwata, et al.
U.S. Appl. No. 14/116,012, filed Nov. 6, 2013, Kashima, et al.
Combined Chinese Office Action and Search Report issued Feb. 3, 2015 in Patent Application No. 201280022305.1 (with English language translation and English translation of categories of cited documents).
Second Notification of Examiner's Opinion issued in corresponding Chinese Patent Application No. 2012800223051 dated Aug. 17, 2015 with English translation.

\* cited by examiner

CONVEYANCE DEVICE FOR GRANULAR MATERIALS

CROSS REFERENCE TO RELATED APPLICATIONS

The present application is a 35 U.S.C. §371 national stage patent application of International patent application PCT/JP2012/064026, filed on May 31, 2012, published as WO/2012/165523 on Dec. 6, 2012, the text of which is incorporated by reference, and claims the benefit of the filing date of Japanese application no. 2011-123666, filed on Jun. 1, 2011, the text of which is also incorporated by reference.

TECHNICAL FIELD

The present invention relates to a transfer device for transferring granular substances.

BACKGROUND ART

Hot-melt adhesives are widely used for manufacturing disposal diapers, binding books and packaging various products. Examples of the material of the hot-melt adhesives include Styrene-Butadiene-Styrene block copolymer (referred to as SBS hereinafter), Styrene-Isoprene-Styrene block copolymer (referred to as SIS hereinafter), Ethylene Vinyl Acetate block copolymer (referred to as EVA hereinafter) and Amorphous PolyAlpha-Olefin (referred to as APAO hereinafter). A tackifier in a form of a hydrogenated petroleum resin is blended in the base polymer.

The hydrogenated petroleum resin is produced by a hydrogenation process for hydrogenating a polymer obtained by adding styrene monomer to cyclopentadiene as disclosed in Patent Literature 1, for instance. The hydrogenated petroleum resin is sometimes provided in a form of hemispherical pellets in view of handleability.

In order to produce the hydrogenated petroleum resin pellets, for instance, it is conceivable that a molten hydrogenated petroleum resin is dropped on a metallic cooling belt conveyor for pelletizing. Then, the cooled resin pellets are scraped off the cooling belt conveyor by a thin-piece scraper, transferred to a hopper via another belt conveyor, a chute and the like, and put into the hopper to be stored.

CITATION LIST

Patent Literature(s)

Patent Literature 1 WO2004/056882 A

SUMMARY OF THE INVENTION

Problem(s) to be Solved by the Invention

The pelletized hydrogenated petroleum resin pellets are relatively hard and brittle. For this characteristic, when the produced hydrogenated petroleum resin pellets are dropped on the belt conveyor through the chute from a pelletizer, the hydrogenated petroleum resin pellets are broken due to impact at the dropping and the like to produce crushed substances and powder. The crushed substances and powder are dropped onto the belt conveyor through the chute together with the hydrogenated petroleum resin pellets. At this time, the powder is especially likely to be scattered in the air when dropped to be adhered or deposited to components or the circumference of the belt conveyor. Accordingly, it is necessary to remove the adhered substance and the deposited substance so as not to cause transfer trouble on the belt conveyor due to the adhered substance and the deposited substance.

However, since such adhered substance and deposited substance are easily scattered in the air, an environment for a removal operation is poor and the removal operation is very troublesome.

An object of the invention is to provide a transfer device capable of stably transferring a granular substance for a long time with an easy maintenance.

Means for Solving the Problem(s)

According to an aspect of the invention, a transfer device of granular substances includes: an inclined surface on which granular substances flow; and a buffer portion that projects from the inclined surface and changes a flow direction of the granular substances by a contact with the granular substances to reduce a flow speed of the granular substances.

In the aspect of the invention, the granular substances flowing on the inclined surface contact with the buffer portion projecting from the inclined surface, so that a flow direction of the granular substances is changed to reduce a flow speed of the granular substances.

Consequently, impact applied on the flowing granular substances is weakened, so that breakage due to the impact during transfer can be inhibited.

In the aspect of the invention, preferably, the buffer portion is provided by a plate member, and a planar direction of the plate member intersects with an inclination direction of the inclined surface.

With this simple arrangement of the plate member projecting from the inclined surface, since the plate member changes the flow direction of the granular substance flowing on the inclined surface to reduce the flow speed thereof, breakage of the granular substances can be inhibited. Further, since the plate member intersects with the inclined surface in the inclination direction, the granular substances are not accumulated on the plate member, but flow diagonally downward relative to the inclination direction of the inclined surface. Accordingly, when a different product is flowed, the product is prevented from being mixed with accumulated granular substances on the buffer plate.

In the aspect of the invention, preferably, the plate member is provided by a plurality of plate members along the inclination direction of the inclined surface, and the planar directions of vertically adjacent ones of the plate members in the inclination direction are inclined in opposite directions.

With this arrangement, the granular substances flow on the inclined surface winding relative to the inclination direction of the inclined surface by the plurality of plate members whose planar directions are inclined in opposite directions. Accordingly, with such a simple arrangement that the plurality of plate members are provided inclined in opposite directions, the flow speed is inhibited from being increased, thereby inhibiting breakage of the granular substances.

According to another aspect of the invention, a transfer device of granular substances includes: an inclined surface on which granular substances flow; and a residence portion that projects from the inclined surface, temporarily accumulates the granular substances flowing on the inclined surface, and changes a flow direction of the granular substances flowing on the inclined surface by a contact between the accumulated granular substances and the granular substances flowing on the inclined surface to reduce a flow speed of the granular substances.

With this arrangement, the granular substances flowing on the inclined surface are temporarily accumulated at the residence portion projecting from the inclined surface. The accumulated granular substances are contacted with granular substances flowing on the inclined surface, so that the flow direction is changed to reduce the flow speed. Consequently, impact applied on the flowing granular substances while contacting with each other is weakened, so that breakage due to the impact during transfer can be inhibited.

In the above aspect of the invention, preferably, the residence portion includes a pair of plate members that project facing each other in a width direction intersecting with a flow direction of the granular substances on the inclined surface, in which a distance between lower ends of the pair of plate members is narrower than a distance between upper ends of the pair of plate members and is sufficient for the granular substances to pass through.

In this arrangement, the pair of plate members are provided to face each other in the width direction of the inclined surface and a distance between the lower ends of the plate members is narrowed while allowing the granular substances to pass through. With this arrangement, the granular substances can be temporarily accumulated in the distance (gap) between the pair of plate members. The accumulated granular substances contact with the granular substances flowing on the inclined surface to change the flow direction and reduce the flow speed.

Accordingly, with such a simple arrangement of the residence portion provided by the pair of plate members, breakage of the granular substances due to impact during transfer can be inhibited. Moreover, supply of the granular substances flowing on the inclined surface is suspended, and then, the accumulated granular substances flow through the lower ends of the plate members. Accordingly, the granular substances are not kept accumulated in the gap between the plate members. Even when a different product is flowed, the product is prevented from being mixed with the granular substances accumulated in the gap between the plate members.

In the above aspect of the invention, preferably, the residence portion includes: a wall plate that flows the granular substances flowing on the inclined surface downward while preventing the granular substances from overflowing the inclined surface; and a plate member that faces the wall plate in the width direction of the inclined surface, in which a lower end of the plate member is close to the wall plate and is distanced from the wall plate to allow the granular substances to pass through.

In this arrangement, the wall plate, which serves as a guide to flow the granular substances flowing on the inclined surface downward while preventing the granular substances from overflowing the inclined surface, is provided with the plate members whose lower ends are close to each other. Accordingly, the granular substances can be temporarily accumulated in a gap between each of the lower ends of the plate member and the wall plate. The accumulated granular substances contact with the granular substances flowing on the inclined surface to change the flow direction and reduce the flow speed.

Accordingly, with such a simple arrangement of the plate members and the wall plate, breakage of the granular substances due to impact during transfer can be inhibited. Moreover, supply of the granular substances flowing on the inclined surface is suspended, and then the accumulated granular substances flow through the gap between the lower end of the plate member and the wall plate. Accordingly, the granular substances are not kept accumulated in the gap between the plate member and wall plate. Even when a different product is flowed, the product is prevented from being mixed with the granular substances accumulated in the gap between the plate member and wall plate.

In the above aspect of the invention, the granular substances are preferably hydrogenated petroleum resin pellets.

With this arrangement, even brittle hydrogenated petroleum resin pellets can be favorably inhibited from being broken during transfer.

With this arrangement, for instance, when the hydrogenated petroleum resin pellets are mixed with a base polymer to prepare a hot-melt adhesive, complication of setting and adjusting production conditions of the hot-melt adhesive can also be prevented, in which the complication is caused when heating-mixing conditions are changed by a change of particle size distribution caused by damage of the hydrogenated petroleum resin pellets.

BRIEF DESCRIPTION OF DRAWING(S)

Figure 3:
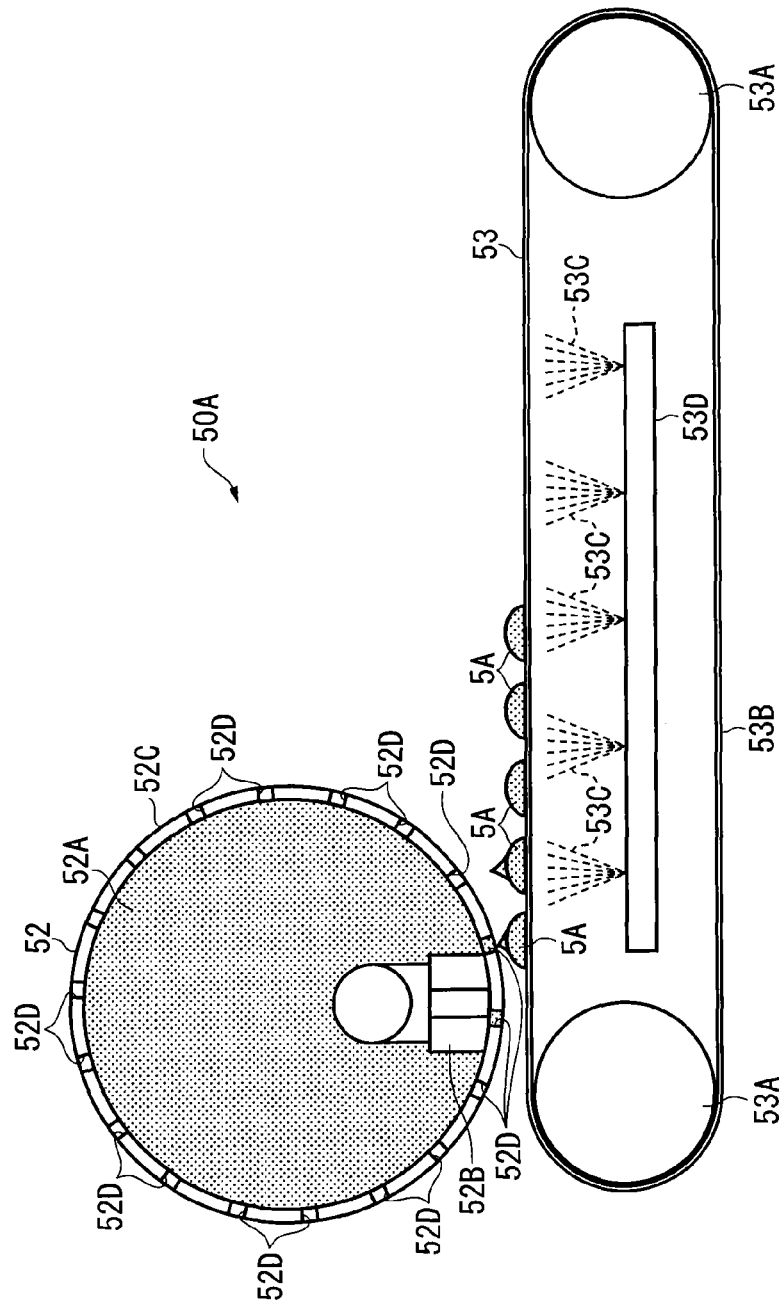

FIG. 3 schematically shows a pelletizing process in the pelletizing portion.

Figure 4:
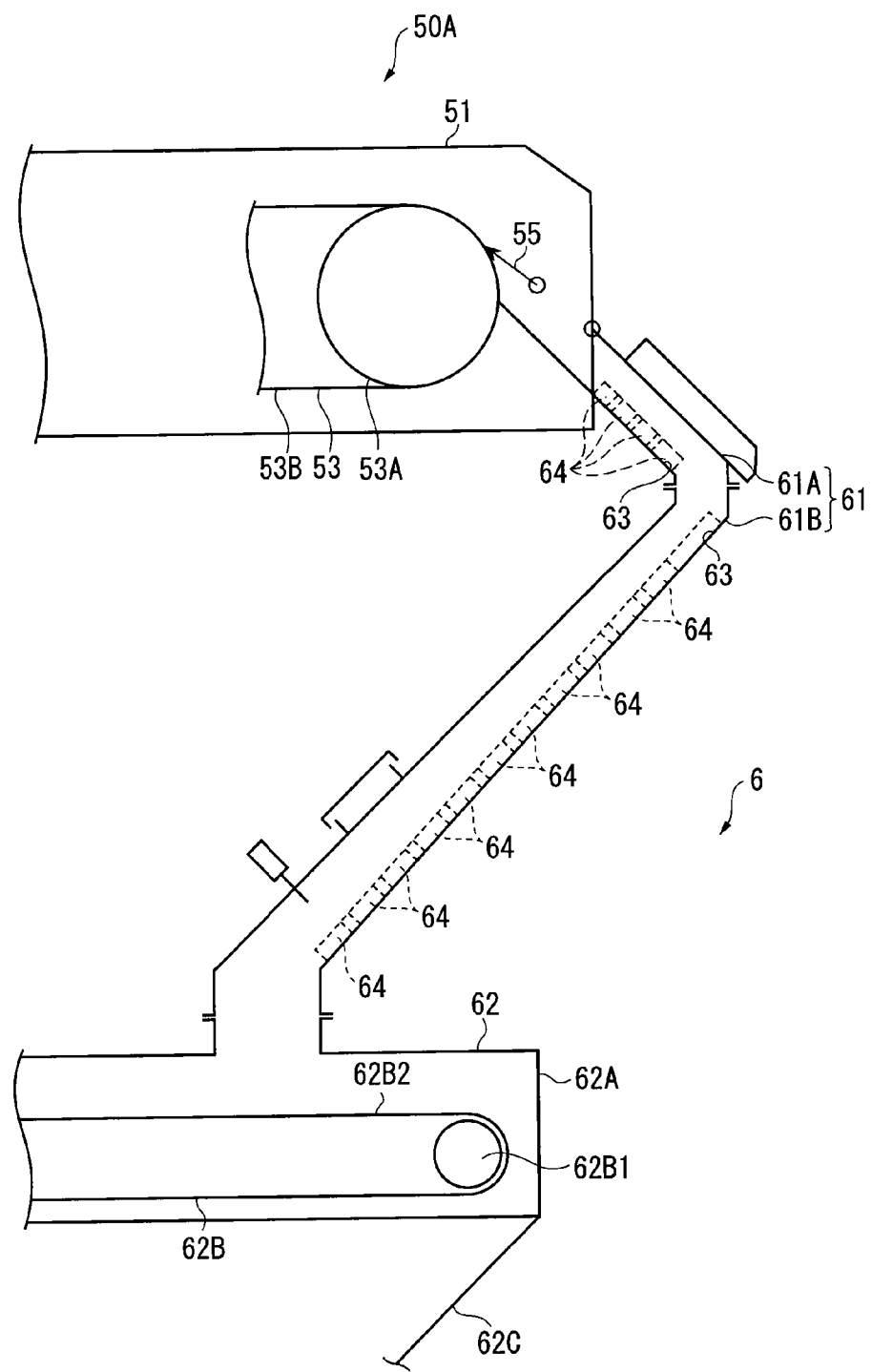

FIG. 4 is a diagram schematically showing an arrangement of a transfer portion in the production plant of the hydrogenated petroleum resin pellets.

Figure 5:
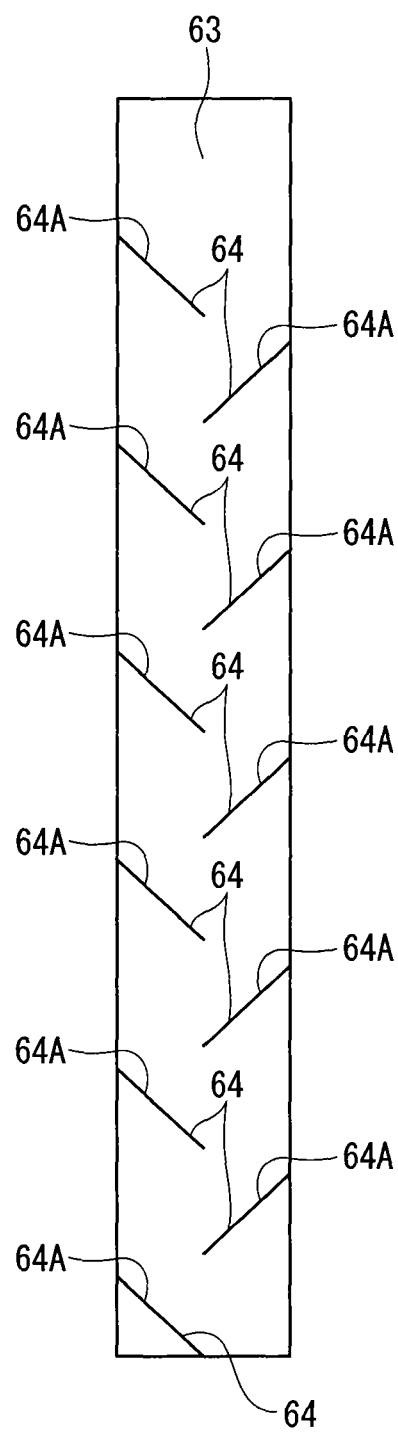

FIG. 5 is a plan view schematically showing a layout of a plurality of buffer plates provided to a chute of the transfer portion.

Figure 6:
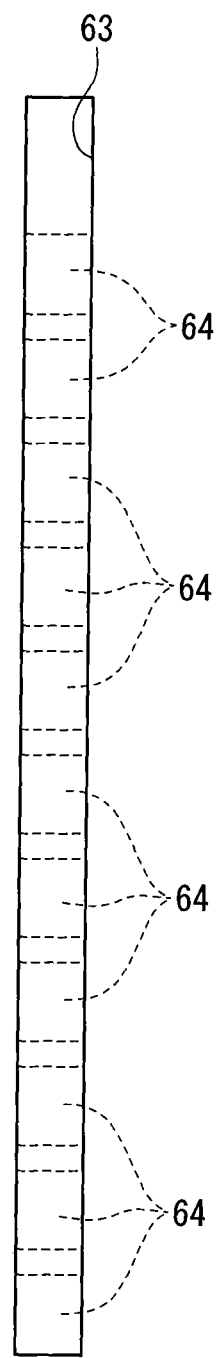

FIG. 6 is a side view schematically showing the layout of the buffer plates.

Figure 7:
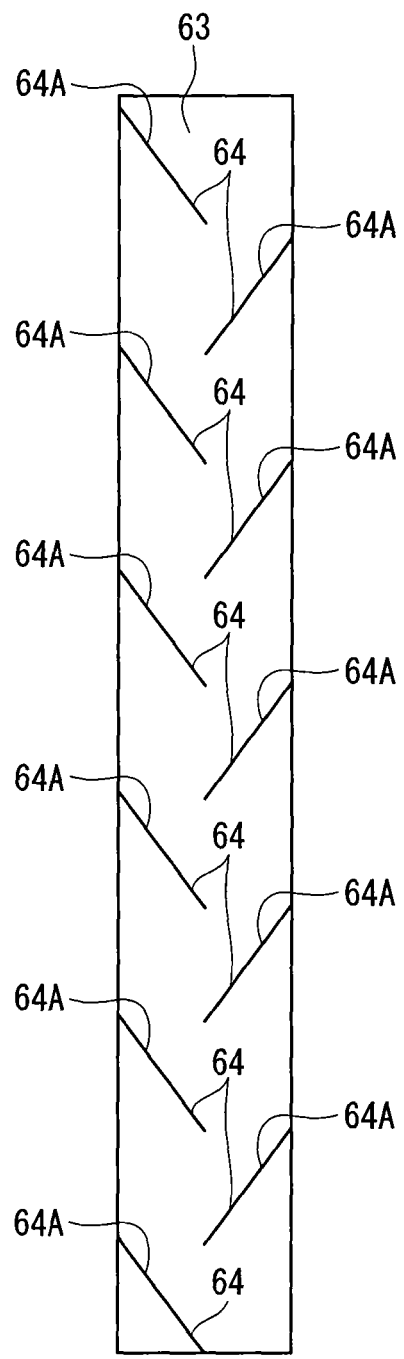

FIG. 7 is a plan view schematically showing a layout of a plurality of buffer plates provided to a chute of a transfer portion according to another exemplary embodiment of the invention.

Figure 8:
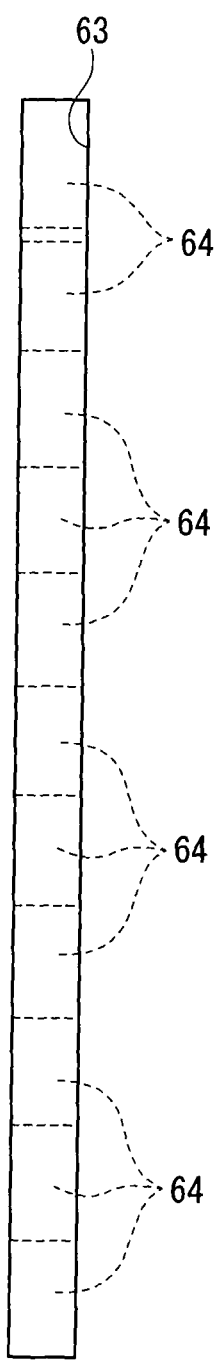

FIG. 8 is a side view schematically showing the layout of the buffer plates.

Figure 9:
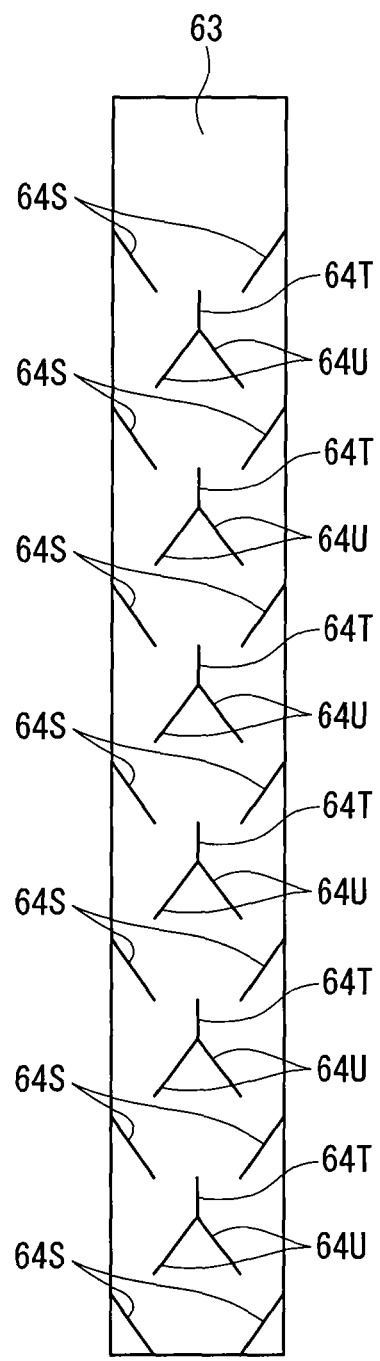

FIG. 9 is a plan view schematically showing a layout of a plurality of buffer plates provided to a chute of a transfer portion according to still another exemplary embodiment of the invention.

Figure 10:
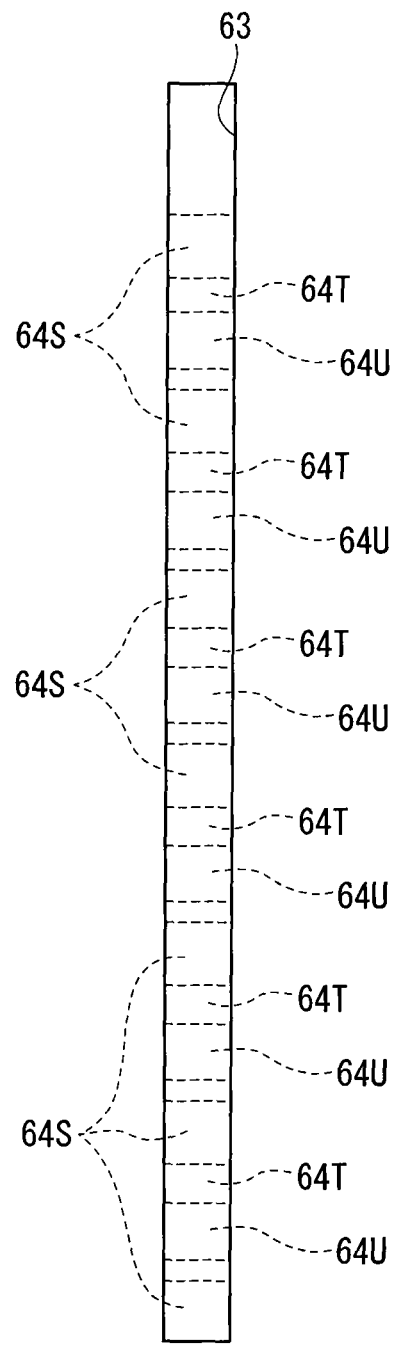

FIG. 10 is a side view schematically showing the layout of the buffer plates.

Figure 11:
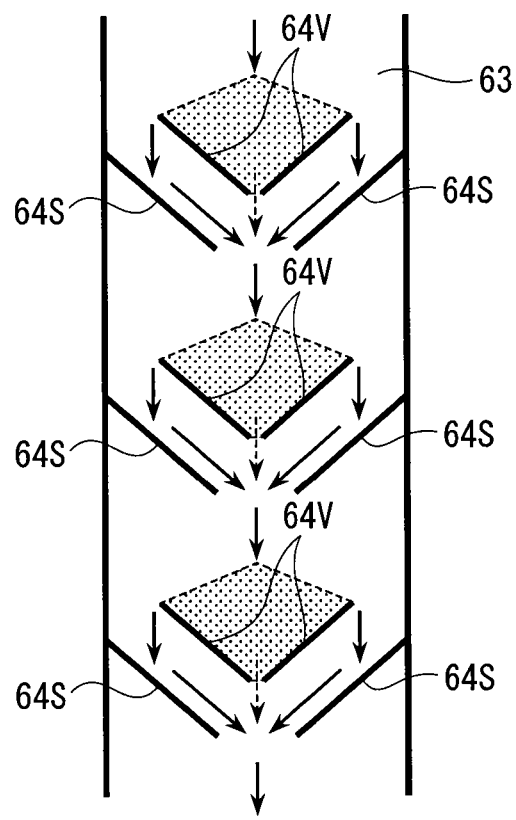

FIG. 11 is a plan view schematically showing a layout of a plurality of buffer plates provided to a chute of a transfer portion according to a further exemplary embodiment of the invention.

Figure 12:
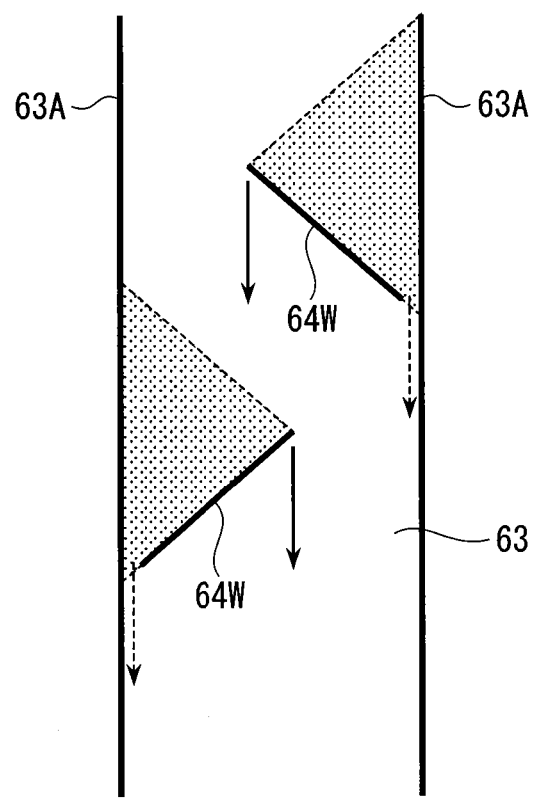

FIG. 12 is a plan view schematically showing a layout of a plurality of buffer plates provided to a chute of a transfer portion according to a still further exemplary embodiment of the invention.

DESCRIPTION OF EMBODIMENT(S)

As a transfer device of pelletized products of the invention, an exemplary embodiment related to a transfer device of hydrogenated petroleum resin pellets will be described below with reference to the attached drawings.

The pelletized product in a form of hydrogenated petroleum resin pellets will be exemplified in the invention. However, the invention is also applicable to various granular substances and especially to granular substances easily broken due to collision.

Initially, an arrangement of a production plant provided with the transfer device of the hydrogenated petroleum resin pellets for producing the hydrogenated petroleum resin pellets will be described below.

Arrangement of Production Plant of Hydrogenated Petroleum Resin Pellets

Figure 1:
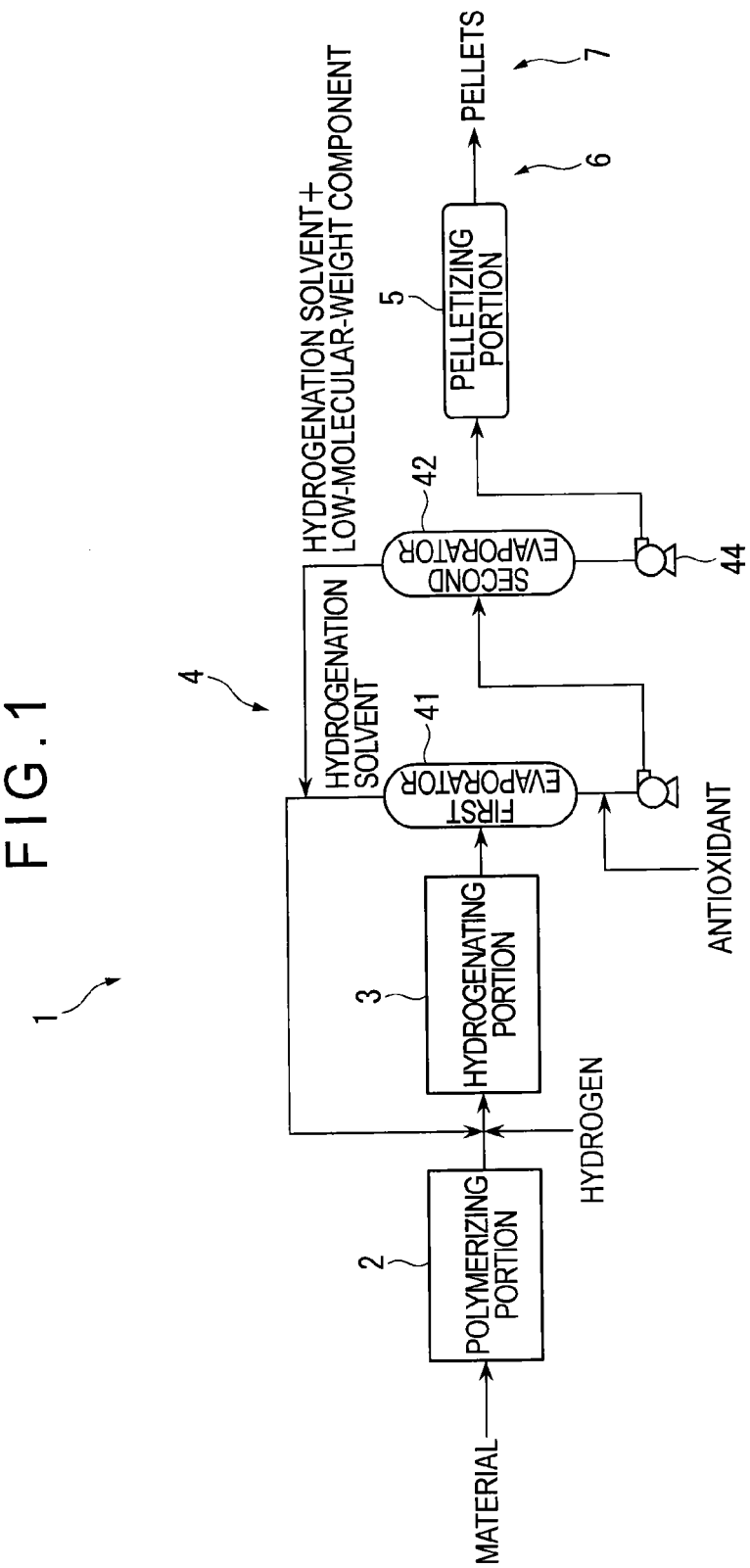
FIG. 1 is a block diagram schematically showing an arrangement of a production plant of hydrogenated petroleum resin pellets in which a transfer device for granular substances of the invention is installed.

As shown in FIG. 1, a production plant 1 for hydrogenated petroleum resin pellets is a plant for producing hydrogenated petroleum resin pellets from a hydrogenated petroleum resin material.

The production plant 1 includes: a polymerizing portion 2; a hydrogenating portion 3; a hydrogenation solvent recovering portion 4; a pelletizing portion 5; a transfer portion 6; a storage portion 7; and a control portion (not shown).

Polymerization Reaction

The polymerizing portion 2 performs a polymerization reaction in which a cyclopentadiene compound and a vinyl aromatic compound are thermally polymerized to produce a copolymer.

The polymerizing portion 2 is provided with, for instance, a polymerization reaction tank in which the hydrogenated petroleum resin materials in a form of the cyclopentadiene compound and the vinyl aromatic compound are thermally polymerized using a solvent.

Examples of the cyclopentadiene compound include cyclopentadiene, methylcyclopentadiene, ethylcyclopentadiene, dimmer thereof and co-dimers thereof.

Examples of the vinyl aromatic compound include styrene, a-methylstyrene and vinyl toluene.

Examples of the solvent include an aromatic solvent, naphthenic solvent and aliphatic hydrocarbon solvent. Specifically, benzene, toluene, xylene, cyclohexane, methylcyclohexane, dimethylcyclohexane and ethylcyclohexane are suitably usable. The solvent is recovered as necessary from the polymerization reaction tank to be recycled.

The recovered solvent typically contains a low-molecular-weight component with a molecular weight approximately in a range from 250 to 300.

In order to avoid degradation of the physical properties, the concentration of the low-molecular-weight component is at least set at 4 mass % or less when the solvent is recycled for the thermal polymerization. According to the content of the low-molecular-weight component in the recovered solvent, the low-molecular-weight component is further separately removed or the solvent is diluted with a new solvent so that the concentration of the low-molecular-weight component falls at 4 mass % or below before being used as the polymerization solvent at the start of the polymerization reaction.

The polymerization reaction tank is a reactor for performing the polymerization in a pressurized and heated environment. The polymerization reaction tank includes a stirrer and a heater (both not shown). A first material tank, a second material tank and a solvent tank of the solvent recovering portion are connected to the polymerization reaction tank, whereby the cyclopentadiene compound, the vinyl aromatic compound and the solvent are put into the polymerization reaction tank as needed. The obtained copolymer flows out through the bottom of the polymerization reaction tank to be subjected to the subsequent hydrogenation reaction.

Herein, though the mixture ratio of the cyclopentadiene compound and the vinyl aromatic compound is not particularly limited, a typical ratio (the cyclopentadiene compound: the vinyl aromatic compound) is in a range from 70:30 to 20:80.

Further, the used amount of the polymerization solvent is in a range from 50 to 500 parts by mass relative to 100 parts by mass of a mixture of the monomers.

At the start of the thermal polymerization, it is desirable that the temperature of the solvent is heated to 100 degrees C. or more, preferably 150 degrees C. or more in the polymerization reaction tank. The mixture of the cyclopentadiene compound and the vinyl aromatic compound is added in a divided manner into the heated solvent in the polymerization reaction tank for copolymerization.

The time for adding the mixture in a divided manner is typically in a range from 0.5 to 5 hours. It is desirable that the mixture is added in equal parts. The copolymerization reaction desirably continues after the addition of the mixture of the cyclopentadiene compound and the vinyl aromatic compound is completed. Though the reaction conditions at this time are not specifically limited, the typical reaction temperature is in a range from 150 to 350 degrees C., the typical reaction pressure is in a range from 0 to 2 MPa and the typical reaction time is in a range from 1 to 10 hours.

After the thermal polymerization in the polymerization reaction tank according to the above conditions, a copolymer having a softening point in a range from 60 to 130 degrees C., a content of the vinyl aromatic compound in a range from 30 to 90 mass %, a bromine number in a range from 30 to 90 g/100 g and a number average molecular weight in a range from 400 to 1000 is obtained.

Hydrogenation Reaction

In the hydrogenating portion 3, a hydrogenation reaction for adding hydrogen to the copolymer generated by the thermal polymerization in the polymerizing portion 2 to obtain a hydrogenated product is performed.

The hydrogenating portion 3 includes a plurality of hydrogenation reactors for performing the hydrogenation reaction for adding hydrogen to the copolymer generated by the thermal polymerization in the polymerizing portion 2 under the presence of the hydrogenation solvent, and the like.

Examples of the hydrogenation solvent are cyclohexane, methylcyclohexane, dimethylcyclohexane, ethylcyclohexane and tetrahydrofuran.

A hydrogenation catalyst is fed in each of the hydrogenation reactors. The hydrogenation reactors may be used in multiple stages. A nickel catalyst, palladium catalyst, cobalt catalyst, platinum catalyst, rhodium catalyst and the like are used for the hydrogenation catalyst. Under the presence of the hydrogenation catalyst, hydrogen and the copolymer are subjected to a hydrogenation reaction at a temperature in a range from 120 to 300 degrees C. and a reaction pressure in a range from 1 to 6 MPa and for a reaction time in a range from 1 to 7 hours.

A hydrogenated product having a softening point in a range from 70 to 140 degrees C., a content of the vinyl aromatic compound in a range from 0 to 35 mass %, a bromine number in a range from 0 to 30 g/100 g and a number average molecular weight in a range from 400 to 1000 is obtained according to the above hydrogenation conditions.

In the hydrogenating portion 3, gas phase component including unreacted hydrogen is separated to be recovered after the hydrogenation by the hydrogenation reactors and is subjected to a process outside the system.

Hydrogenation Solvent Removal

The hydrogenation solvent recovering portion 4 separates and removes the hydrogenation solvent from the hydrogenated product. The hydrogenation solvent recovering portion 4 includes a solvent evaporation tank 41 (first evaporator), a thin-film evaporator 42 (second evaporator) and the like.

The solvent evaporation tank 41 is connected to the hydrogenating portion 3. The solvent evaporation tank 41 separates and recovers the hydrogenation solvent by evaporation from the hydrogenated product obtained in the hydrogenating portion 3. The evaporated hydrogenation solvent is separately recovered and is recycled as the hydrogenation solvent used during the hydrogenation reaction in the hydrogenating portion 3.

The thin-film evaporator 42 is connected to the solvent evaporation tank 41. The thin-film evaporator 42 separates and recovers the hydrogenation solvent remained in the hydrogenated product by evaporation. The evaporated hydrogenation solvent and the low-molecular-weight component are separately recovered and are recycled as a hydrogenation solvent used during the hydrogenation reaction in the hydrogenating portion 3 according to the values of the physical properties of the hydrogenated petroleum resin pellets to be produced (target hydrogenated petroleum resin).

An adding portion for adding an antioxidant is provided between the solvent evaporation tank 41 and the thin-film evaporator 42 of the hydrogenation solvent recovering portion 4.

The adding portion of the antioxidant adds an antioxidant to the hydrogenated product from which most of the hydrogenation solvent is removed in the solvent evaporation tank 41.

The solvent in which the antioxidant is dissolved is to be separated and recovered together with the accumulated hydrogenation solvent in the evaporation process by the downstream thin-film evaporator 42. The recovered hydrogenation solvent can be recycled for the hydrogenation reaction since the solvent in which the antioxidant is dissolved does not influence the hydrogenation reaction. The solvent in which the antioxidant is dissolved is separated and recovered together with the hydrogenation solvent from the hydrogenated product by the downstream thin-film evaporator 42.

Pelletizing

The pelletizing portion 5 pelletizes the molten resin (i.e. the hydrogenated product from which the hydrogenation solvent is removed and to which the antioxidant is added) into hydrogenated petroleum resin pellets.

Figure 2:
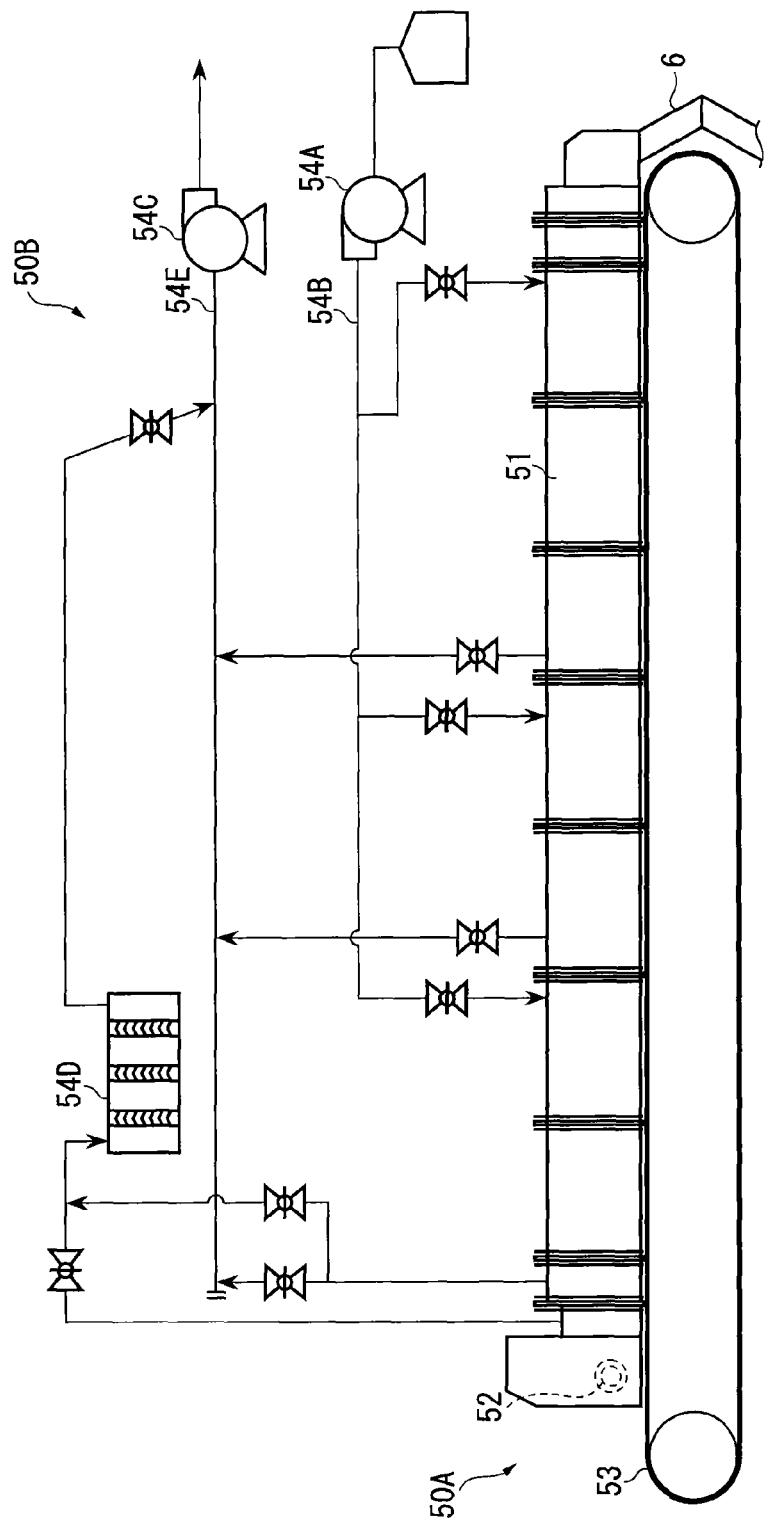
FIG. 2 is a diagram schematically showing an arrangement of a pelletizing portion in the production plant of the hydrogenated petroleum resin pellets.

Specifically, as shown in FIG. 2, the pelletizing portion 5 includes a pelletizer 50A and a pellet-air-cooling unit 50B.

As shown in FIG. 3, the pelletizer 50A includes a pelletizer body 52 and a cooling conveyor 53.

The pelletizer body 52 is disposed in a pelletizing case 51 in a manner to face an upstream end of the cooling conveyor 53 in a transfer direction. The pelletizer body 52 includes a trunk 52A having a cylindrical heating portion (not shown) and a die 52B that axially discharges a molten resin from an outer circumferential surface of the trunk 52A.

Further, the pelletizer body 52 includes a cylindrical rotary body 52C that is rotatably fitted to the outer circumferential surface of the trunk 52A. The rotary body 52C has a plurality of discharge holes 52D in a pattern of a perforated metal. When the outer circumferential surface of the trunk 52A is rotated to position the discharge holes 52D to the die 52B, a predetermined amount of the molten resin 5A is discharged on the cooling conveyor 53.

The cooling conveyor 53, which is disposed in the pelletizing case 51, includes a pair of pulleys 53A and a metallic belt 53B (a metallic endless belt) that is rotatably wound around the pulleys 53A.

Further, the cooling conveyor 53 includes a cooling portion 53D that ejects cooling water 53C toward a backside of the metallic belt 53B to cool the metallic belt 53B. It should be noted that a method for cooling the metallic belt 53B is not limited to ejecting the cooling water 53C, but any method (e.g., spraying of cool air) is applicable.

As shown in FIG. 2, the pellet-air-cooling unit 50B includes: an air intake 54B having an air-feeding blower 54A that introduces air to the pelletizing case 51; and an intake duct 54E having a filter 54D and an intake blower 54C that sucks air within the pelletizing case 51.

The air intake 54B is provided so as to introduce air into the pelletizing case 51 at positions corresponding to a downstream end and two middle positions of the cooling conveyor 53.

The intake duct 54E is provided so as to suck air in the pelletizing case 51 at positions corresponding to three positions near the pelletizer body 52 at the upstream end of the cooling conveyor 53 and two positions in the middle in the transfer direction of the cooling conveyor 53, in other words, in a range until the molten resin dropped on the cooling conveyor 53 is solidified. In the intake duct 54E, the filter 54D captures and removes low-molecular-weight component mist from air containing the low-molecular-weight component mist in the pelletizing case 51, so that only air is exhausted.

Intake and exhaust of air in the middle positions are suitably designed according to different softening points of to-be-produced hydrogenated petroleum resin pellets. Specifically, a structure allowing intake and exhaust of air at a plurality of positions is preferable so as to cope with a case where the range until the molten resin is solidified differs depending on products.

As the filter 54D, an inertial collision filter, a blocking filter, an electrostatic adsorption filter, a Brownian diffusion filter and the like are used, among which a glass fiber filter is preferable. Specifically, since the low-molecular-weight component mist is formed of highly viscous microparticles having a mist diameter of 1 µm or less, the glass fiber filter that provides an effect to capture particles having an ignorable mass (i.e., capture effect by Brownian diffusion) in addition to the inertial collision effect is preferable A pressure loss of the filter 54D is preferably set in a range of 0.5 kPa to 2.5 kPa in view of a relationship with a filtration area.

As shown in FIG. 4, a scraper 55 that scrapes the hydrogenated petroleum resin pellets solidified on the metallic belt is disposed at the downstream end of the cooling conveyor 53 in the pelletizing case 51.

Further, a transfer portion 6 that is positioned at the downstream end of the cooling conveyor 53 and transfers the hydrogenated petroleum resin pellets to the storage portion 7 is connected to the pelletizing case 51.

Transfer

The transfer portion 6 transfers the hydrogenated petroleum resin pellets produced in the pelletizing portion 5 to the storage portion 7.

As shown in FIG. 4, the transfer portion 6 includes: a chute 61 connected to the pelletizing portion 5; a transfer conveyor 62 connected to the chute 61; and a bucket conveyor (not shown).

The chute 61 includes: an upper chute 61A of which one end is connected to a lower part of the pelletizing case 51 at the downstream end of the cooling conveyor 53 and the other end extends downward; and a lower chute 61B of which one end is connected to a lower end of the upper chute 61A and the other end extends opposed to the upper chute 61A. The chute 61 is formed in a V-shape in a lateral view.

The upper chute 61A and the lower chute 61B are provided such that an inclined surface 63 on which the hydrogenated petroleum resin pellets flow is inclined at an inclination angle in a range of 44 degrees to 75 degrees relative to the horizontal surface.

Herein, when the inclination angle of the inclined surface 63 is less than 44 degrees, the hydrogenated petroleum resin pellets are accumulated on the inclined surface 63. When the product to be produced is changed, the accumulated hydrogenated petroleum resin pellets may be mixed with the newly produced product. On the other hand, when the inclination angle of the inclined surface 63 is sharp (i.e. more than 75 degrees), the flow speed of the hydrogenated petroleum resin pellets flowing on the inclined surface 63 is increased, which may break the hydrogenated petroleum resin pellets due to impact of the flow.

A plurality of buffer plates 64 (plate members) are provided upright on the inclined surface 63, on which the hydrogenated petroleum resin pellets flow, in each of the upper chute 61A and the lower chute 61B, as shown in FIGS. 4 to 6.

The buffer plates 64, each of which is formed of, for instance, a steel plate, project from the inclined surface 63 such that the buffer plates 64 change the flow direction of the hydrogenated petroleum resin pellets by contact with the hydrogenated petroleum resin pellets, thereby decreasing the flow speed of the hydrogenated petroleum resin pellets. The plurality of buffer plates 64 are provided upright on the inclined surface 63 in a manner to intersect with (i.e., be inclined to) the inclination direction of the inclined surface 63. Each of the buffer plates 64 has a slip surface 64A (an upper surface) on which the hydrogenated petroleum resin pellets can slip. The plurality of buffer plates 64 are sequentially provided upright on the inclined surface 63 such that the slip surfaces 64A are inclined alternately in opposite inclination directions and a lower end of each of the slip surfaces 64A faces an upper portion of each of the buffer plates 64 provided downstream. In other words, vertically adjacent ones of the buffer plates 64 in the inclination direction of the inclined surface 63 are provided such that planar directions of the slip surfaces 64A are inclined in opposite directions, whereby the hydrogenated petroleum resin pellets flow downward in a manner winding in the inclination direction of the inclined surface 63.

The buffer plates 64 are provided upright such that each of the slip surfaces is inclined at the inclination angle in a range of 40 degrees to 52 degrees relative to a plane perpendicular to a longitudinal direction of the inclined surface 63.

Herein, when each of the slip surfaces 64A is a moderately inclined surface at the inclination angle of less than 40 degrees, the hydrogenated petroleum resin pellets are accumulated on the inclined surface 63. When the product to be produced is switched, the accumulated hydrogenated petroleum resin pellets may be mixed in the newly produced product. On the other hand, when each of the slip surfaces 64A is a sharply inclined surface at the inclination angle of more than 52 degrees, the flow speed of the hydrogenated petroleum resin pellets flowing on the inclined surface 63 and the slip surfaces 64A is increased, which may break the hydrogenated petroleum resin pellets due to impact while the pellets flow downward.

Specifically, provided that the flow speed of the flowing hydrogenated petroleum resin pellets stays slower than 1.98 m/second at which the hydrogenated petroleum resin pellets are not broken, the inclination angle of the inclined surface 63 and the inclination angle of each of the slip surfaces of the buffer plates 64 are preferably set at an repose angle or more at which the hydrogenated petroleum resin pellets are not accumulated.

The transfer conveyor 62 includes a conveyor case 62A, a belt conveyor 62B, and a collecting hopper 62C, as shown in FIG. 4.

The belt conveyor 62B is disposed in the conveyor case 62A to which the lower end of the lower chute 61B is connected and transfers the hydrogenated petroleum resin pellets having flowed through the lower chute 61B. The belt conveyor 62B includes a pair of transfer pulleys 62B1 and an endless belt 62B2 that is rotatably wound around the transfer pulleys 62B1.

At the other end of the conveyor case 62A, a loading chute (not shown) for loading the hydrogenated petroleum resin pellets transferred by the belt conveyor 62B to the storage portion 7 is provided. It is preferable that the loading chute is also provided with a plurality of buffer plates 64 described above. A bucket conveyor that transfers the hydrogenated petroleum resin pellets to the storage portion 7 is connected to the loading chute.

The collecting hopper 62C is opened with a diameter thereof being enlarged upward and includes a plurality of collecting hoppers 62C provided to a lower surface of the conveyor case 62A under the belt conveyor 62B. An inner surface of the collecting hopper 62C is formed to be inclined at an angle larger than the repose angle at which the powdery hydrogenated petroleum resin pellets slip down, specifically at the angle of 70 degrees or more relative to the horizontal surface. The plurality of collecting hoppers 62C are not necessarily provided. Only a single collecting hopper 62C may be provided as long as the collecting hopper 62C is provided under the lower chute 61B and can collect the hydrogenated petroleum resin pellets overflowing the belt conveyor 62B after flowing through the lower chute 61B.

A screw conveyor (not shown) is provided to a lower portion of each of the plurality of collecting hoppers 62C. The screw conveyor is adapted to transfer the hydrogenated petroleum resin pellets and powder thereof which are collected by each of the collecting hoppers 62C to the outside of the collecting hoppers 62C. The screw conveyor is provided to the lower portion of the collecting hopper 62C in this exemplary embodiment. However, a belt conveyor or a simply openable/closable exhaust opening may alternatively be provided thereto.

Storage

The storage portion 7 stores the hydrogenated petroleum resin pellets transferred by the transfer portion 6 in a manner so that the pellets are capable of being taken out.

The storage portion 7 includes storage hopper(s) (not shown) and a switching portion (not shown) for loading the hydrogenated petroleum resin pellets transferred by the bucket conveyor of the transfer portion 6 to a predetermined one of the storage hopper(s).

Advantage(s) of Embodiment(s)

As described above, in the exemplary embodiment, the buffer plates 64 project from the inclined surface 63 of the chute 61 of the transfer portion 6.

With this arrangement, the hydrogenated petroleum resin pellets flowing on the inclined surface 63 contact with the buffer plates 64 to change the flow direction, whereby the flow speed of the hydrogenated petroleum resin pellets is reduced. Accordingly, the impact applied on the flowing hydrogenated petroleum resin pellets is weakened, thereby inhibiting the breakage due to the impact during transfer of the hydrogenated petroleum resin pellets.

In the exemplary embodiment, the buffer plates 64 shaped in a plate project from the inclined surface 63 while the planar direction of each of the buffer plates 64 intersects with the inclination direction of the inclined surface 63.

Accordingly, with such a simple arrangement that plate members project from the inclined surface 63, breakage of the hydrogenated petroleum resin pellets can be inhibited. Further, since the buffer plates 64 intersect with the inclined surface 63 in the inclination direction, the hydrogenated petroleum resin pellets are not accumulated on the buffer plates 64, but flow diagonally downward relative to the inclination direction of the inclined surface 63. Accordingly, when a different product is flowed, the product is prevented from being mixed with the accumulated hydrogenated petroleum resin pellets on the buffer plates 64.

Moreover, in the exemplary embodiment, the plurality of buffer plates 64 projecting from the inclined surface 63 are provided in the inclination direction of the inclined surface 63. Vertically adjacent ones of the buffer plates 64 in the inclination direction of the inclined surface 63 are provided such that the planar directions of the adjacent buffer plates 64 are inclined in opposite directions.

Accordingly, with such a simple arrangement that the plurality of buffer plates 64 are inclined in opposite directions, the flow speed of the hydrogenated petroleum resin pellets is inhibited from being increased, thereby inhibiting breakage of the hydrogenated petroleum resin pellets during transfer.

In the exemplary embodiment, the above arrangement is used for favorably transferring brittle hydrogenated petroleum resin pellets, whereby the hydrogenated petroleum resin pellets are transferred while being prevented from breakage.

With this arrangement, for instance, when the hydrogenated petroleum resin pellets are mixed with a base polymer to prepare a hot-melt adhesive, setting and adjusting production conditions of the hot-melt adhesive can also be prevented from being complicated due to a change in heating-mixing conditions caused by a change in particle size distribution on account of breakage of the hydrogenated petroleum resin pellets.

Modification(s)

Incidentally, it should be understood that the scope of the present invention is not limited to the above-described exemplary embodiment(s) but includes modifications and improvements as long as the modifications and improvements are compatible with the invention.

Specifically, the brittle hydrogenated petroleum resin pellets are transferred in the exemplary embodiment, but various kinds of granular substances that may be broken by receiving impact when flowing for transfer are usable.

The layout of the buffer plates 64 provided to the chute 61 of the transfer portion 6 is not limited to the above layout. For instance, as shown in FIGS. 7 and 8, when the inclination angle of the inclined surface 63 is moderate, the slip surface 64A may be sharply inclined.

Moreover, for instance, as shown in FIGS. 9 and 10, the buffer plates 64 may be disposed such that the hydrogenated petroleum resin pellets flow in the inclination direction of the inclined surface 63 in a manner to wind on both side thereof.

Specifically, the buffer plates 64 may be provided by a plurality of first buffer plates 64S that are inclined from both sides of the inclined surface 63 toward the center, a second buffer plate 64T that has an upper end positioned in the middle between lower ends of the first buffer plates 64S facing each other at the same height and has a plane surface along the inclination direction of the inclined surface 63, and third buffer plates 64U that are respectively inclined from a lower end of the second buffer plates 64T toward upper ends of the first buffer plates 64S immediately below the third buffer plates 64U and are formed with the second buffer plates 64T in a Y-shape in a plan view.

Also with the arrangement shown in FIGS. 9 and 10, the hydrogenated petroleum resin pellets can be transferred without breakage in the same manner as in the exemplary embodiment.

Further, for instance, as shown in FIG. 11, a residence portion in which the flowing hydrogenated petroleum resin pellets contact with each other to reduce flow impact may be provided. In other words, by temporarily accumulating the hydrogenated petroleum resin pellets flowing on the inclined surface 63 and contacting the accumulated hydrogenated petroleum resin pellets with the hydrogenated petroleum resin pellets flowing on the inclined surface 63, the flow direction of the hydrogenated petroleum resin pellets may be changed to reduce the flow speed of the hydrogenated petroleum resin pellets.

Specifically, the plurality of first buffer plates 64S that are inclined from both the sides of the inclined surface 63 toward the center, and a pair of fourth buffer plates 64V (plate members) formed in a V-shape in a plan view and positioned above the first buffer plates 64S may be provided, in which planes of the fourth buffer plates 64V are respectively in parallel to the first buffer plates 64S, and lower ends of the fourth buffer plates 64V are positioned in the middle of the inclined surface 63 and face each other with a predetermined gap in a width direction (i.e., in a direction intersecting with the inclination direction of the inclined surface 63). The gap (distance) between the facing lower ends of the pair of fourth buffer plates 64V is designed in a size at which not all of the produced hydrogenated petroleum resin pellets pass through the gap but a part thereof is accumulated in the gap between the fourth buffer plates 64V to gradually flow through the gap like a sand clock. For instance, the gap is preferably designed in a size that is six times larger than the maximum particle diameter of each of hydrogenated petroleum resin pellets and is shorter than a gap between the facing first buffer plates 64S.

Further, a distance from the gap of the fourth buffer plates 64V to the hydrogenated petroleum resin pellets accumulated in the gap between next fourth buffer plates 64V immediately below is set at a distance allowing the flow speed of the hydrogenated petroleum resin pellets not to be higher than the flow speed of 1.98 m/second. Particularly, in order to further reduce impact, the distance from the gap between each of the fourth buffer plates 64V to the immediately next ones of the fourth buffer plates 64V is preferably set at a distance allowing the flow speed of the hydrogenated petroleum resin pellets before contacting with the subsequent ones of the fourth buffer plates 64V not to be higher than the flow speed of 1.98 m/second. In addition, a distance from an upper end of each of the fourth buffer plates 64V to each of the first buffer plates 64S is set at a distance allowing the flow speed of the hydrogenated petroleum resin pellets not to be higher than the flow speed of 1.98 m/second.

Even with the arrangement shown in FIG. 11, the hydrogenated petroleum resin pellets can be transferred without breakage.

Moreover, as the arrangement of the residence portion for temporarily accumulating the hydrogenated petroleum resin pellets to contact with each other and changing the flow direction of the hydrogenated petroleum resin pellets, for instance, an arrangement shown in FIG. 12 may be employed.

Specifically, in the arrangement shown in FIG. 12, a fifth buffer plate 64W (plate member) projects from the inclined surface 63 in a manner to be inclined relative to a wall plate 63A with a lower end of the fifth buffer plate 64W being close to the wall plate 63A. The wall plate 63A is provided along each side of the inclined surface 63 of the chute 61 and serves as a guide for flowing the hydrogenated petroleum resin pellets downward while preventing the hydrogenated petroleum resin pellets from overflowing the inclined surface 63. Between the lower end of the fifth buffer plate 64W and the wall plate 63A, there is provided a gap through which not all of the produced hydrogenated petroleum resin pellets pass but, like a sand clock, a part thereof is accumulated in the gap between the fifth buffer plate 64W and the wall plate 63A to gradually flow. In the same manner as in the exemplary embodiment shown in FIG. 11, for instance, the gap is preferably designed in a size that is six times larger than the maximum particle diameter of each of hydrogenated petroleum resin pellets and is shorter than a gap between an upper end of the fifth buffer plate 64W and the wall plate 63A.

Further, a distance from an upper end of the fifth buffer plate 64W to the next fifth buffer plate 64W immediately below is set at a distance that keeps the flow speed of the hydrogenated petroleum resin pellets overflowing the upper end of the fifth buffer plate 64W from not being higher than the flow speed of 1.98 m/second.

Even with the arrangement shown in FIG. 12, the hydrogenated petroleum resin pellets can be transferred without breakage.

In the exemplary embodiments, the arrangement for changing the flow direction of the hydrogenated petroleum resin pellets is exemplarily provided by projecting the plate members such as the buffer plates 64. However, the plate members may be replaced by, for instance, a plurality of pinball pin members to change the flow direction of the hydrogenated petroleum resin pellets flowing on the inclined surface 63.

Other specific structure and process in implementing the invention may be altered otherwise as long as the structure and the process are compatible with the invention.

The invention claimed is:

1. A transfer device of hydrogenated petroleum resin pellets, comprising:
   an inclined surface adapted to allow the hydrogenated petroleum resin pellets to flow; and
   a plurality of buffer plates that project from the inclined surface such that planar directions of the plurality of buffer plates intersect with an inclination direction of the inclined surface,
   wherein the buffer plates are adapted to change a flow direction of the hydrogenated petroleum resin pellets by contacting the hydrogenated petroleum resin pellets to reduce a flow speed of the hydrogenated petroleum resin pellets,
   the inclined surface is provided to be inclined at an inclination angle of from 44 degrees to 75 degrees relative to the horizontal surface,
   vertically adjacent buffer plates of the plurality of buffer plates are provided such that planar directions of the vertically adjacent buffer plates of the plurality of buffer plates are inclined in opposite directions,
   slip surfaces of the buffer plates, on which the hydrogenated petroleum resin pellets are configured to slip, are inclined at an inclination angle of from 40 degree to 52 degrees relative to a plane perpendicular to a longitudinal direction of the inclined surface, and
   the plurality of buffer plates are adapted to reduce the flow speed of the hydrogenated petroleum resin pellets to be slower than 1.98 m/second.

2. A transfer device of hydrogenated petroleum resin pellets, comprising:
   an inclined surface adapted to allow the hydrogenated petroleum resin pellets to flow; and
   a residence portion that projects from the inclined surface, wherein the residence portion is adapted to temporarily accumulate the hydrogenated petroleum resin pellets flowing on the inclined surface, and wherein the residence portion is adapted to change a flow direction of the hydrogenated petroleum resin pellets flowing on the inclined surface by a contact between the accumulated hydrogenated petroleum resin pellets and the hydrogenated petroleum resin pellets flowing on the inclined surface to reduce a flow speed of the hydrogenated petroleum resin pellets,
   the inclined surface is provided to be inclined at an inclination angle of from 44 degrees to 75 degrees relative to the horizontal surface,
   the residence portion comprises a pair of plate members facing each other in a width direction intersecting with a flow direction of the hydrogenated petroleum resin pellets on the inclined surface,
   the pair of plate members project at a distance between lower ends of the pair of plate members narrower than a distance between upper ends of the pair of plate members and sufficient for the hydrogenated petroleum resin pellets to pass through, and
   the residence portion is adapted to reduce the flow speed of the hydrogenated petroleum resin pellets to be slower than 1.98 m/second.

3. The transfer device of claim 2, wherein
   the residence portion comprises a pair of plate members that project facing each other in a width direction intersecting with a flow direction of the hydrogenated petroleum resin pellets on the inclined surface, wherein
   a distance between lower ends of the pair of plate members is narrower than a distance between upper ends of the pair of plate members and is sufficient for the hydrogenated petroleum resin pellets to pass through.

4. The transfer device of claim 3, wherein
   the residence portion comprises: a wall plate adapted to direct the hydrogenated petroleum resin pellets flowing on the inclined surface downward while preventing the hydrogenated petroleum resin pellets from overflowing the inclined surface; and a plate member that faces the wall plate in the width direction of the inclined surface, wherein
   a lower end of the plate member is close to the wall plate and is distanced from the wall plate to allow the hydrogenated petroleum resin pellets to pass through.

5. A process for transferring hydrogenated petroleum resin pellets, the process comprising:
   feeding the hydrogenated petroleum resin pellets to the transfer device of claim 1;
   making the hydrogenated petroleum resin pellets flow along the inclined surface; and
   changing a flow direction of the hydrogenated petroleum resin pellets by contacting the hydrogenated petroleum resin pellets with the buffer plates, thereby reducing a flow speed of the hydrogenated petroleum resin pellets.

6. A process for transferring hydrogenated petroleum resin pellets, the process comprising:
   feeding the hydrogenated petroleum resin pellets to the transfer device of claim 2;
   making the hydrogenated petroleum resin pellets flow along the inclined surface;
   temporarily accumulating the hydrogenated petroleum resin pellets in the residence portion; and changing a flow direction of the hydrogenated petroleum resin pellets by a contact between the accumulated hydrogenated petroleum resin pellets and the hydrogenated petroleum resin pellets flowing on the inclined surface to reduce a flow speed of the hydrogenated petroleum resin pellets.

7. The process of claim 6, wherein
the residence portion comprises a pair of plate members that project facing each other in a width direction intersecting with a flow direction of the hydrogenated petroleum resin pellets on the inclined surface, wherein
a distance between lower ends of the pair of plate members is narrower than a distance between upper ends of the pair of plate members and is sufficient for the hydrogenated petroleum resin pellets to pass through.

8. The process of claim 7, wherein
the residence portion comprises: a wall plate that directs the hydrogenated petroleum resin pellets flowing on the inclined surface downward while preventing the hydrogenated petroleum resin pellets from overflowing the inclined surface; and a plate member that faces the wall plate in the width direction of the inclined surface, wherein
a lower end of the plate member is close to the wall plate and is distanced from the wall plate to allow the hydrogenated petroleum resin pellets to pass through.

9. A transfer device of hydrogenated petroleum resin pellets, comprising:
an inclined surface adapted to allow the hydrogenated petroleum resin pellets to flow; and
a residence portion that projects from the inclined surface,
wherein the residence portion is adapted to temporarily accumulate the hydrogenated petroleum resin pellets flowing on the inclined surface, and wherein the residence portion is adapted to change a flow direction of the hydrogenated petroleum resin pellets flowing on the inclined surface by a contact between the accumulated hydrogenated petroleum resin pellets and the hydrogenated petroleum resin pellets flowing on the inclined surface to reduce a flow speed of the hydrogenated petroleum resin pellets,
the inclined surface is provided to be inclined at an inclination angle of from 44 degrees to 75 degrees relative to the horizontal surface,
the residence portion comprises: a wall plate adapted to flow the hydrogenated petroleum resin pellets flowing on the inclined surface downward while preventing the hydrogenated petroleum resin pellets from overflowing the inclined surface; and a plate member that faces the wall plate in a width direction of the inclined surface, wherein a lower end of the plate member is close to the wall plate and is distanced from the wall plate to allow the hydrogenated petroleum resin pellets to pass through, and
the residence portion is adapted to reduce the flow speed of the hydrogenated petroleum resin pellets to be slower than 1.98 m/second.

* * * * *